(12) United States Patent
Huang et al.

(10) Patent No.: US 8,189,913 B2
(45) Date of Patent: May 29, 2012

(54) METHOD FOR DETECTING SHADOW OF OBJECT

(75) Inventors: Chung-Hsien Huang, Tainan (TW); Ruei-Cheng Wu, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 814 days.

(21) Appl. No.: 12/350,209

(22) Filed: Jan. 7, 2009

(65) Prior Publication Data

US 2010/0111362 A1    May 6, 2010

(30) Foreign Application Priority Data

Nov. 6, 2008  (TW) ................................ 97142854 A

(51) Int. Cl.
*G06K 9/00* (2006.01)
(52) U.S. Cl. .................. 382/170; 382/164; 382/103
(58) Field of Classification Search .................. 382/170, 382/164, 103
See application file for complete search history.

(56) References Cited

U.S. PATENT DOCUMENTS

| | | | | |
|---|---|---|---|---|
| 5,592,567 | A * | 1/1997 | Kilger | 382/199 |
| 6,661,918 | B1 * | 12/2003 | Gordon et al. | 382/173 |
| 6,754,367 | B1 * | 6/2004 | Ito et al. | 382/103 |
| 7,305,127 | B2 * | 12/2007 | Wells | 382/168 |
| 2002/0057343 | A1 * | 5/2002 | Ronk et al. | 348/169 |
| 2003/0194131 | A1 * | 10/2003 | Zhao et al. | 382/190 |
| 2005/0025357 | A1 * | 2/2005 | Landwehr et al. | 382/170 |
| 2006/0290780 | A1 * | 12/2006 | Porikli | 348/129 |
| 2007/0047809 | A1 * | 3/2007 | Sasaki | 382/170 |
| 2007/0104389 | A1 * | 5/2007 | Wells | 382/274 |
| 2007/0110309 | A1 * | 5/2007 | Ibrahim et al. | 382/171 |
| 2008/0247599 | A1 * | 10/2008 | Porikli et al. | 382/103 |
| 2010/0092036 | A1 * | 4/2010 | Das et al. | 382/103 |

FOREIGN PATENT DOCUMENTS

TW          200535719          11/2005

OTHER PUBLICATIONS

"Cast Shadow Removal Combining Local and Global Features," Zhou Liu et al., IEEE Conference on Computer Vision and Pattern Recognition, 2007 , 8 pages.*
"Bayesian Foreground and Shadow Detection in Uncertain Frame Rate Surveillance Videos," Csaba Benedek et al., IEEE Transactions on Image Processing, vol. 17, No. 4, Apr. 2008, pp. 608-621.*
"Effective Moving Cast Shadow Detection for Monocular Color Image Sequences," George S.K. Fung et al., 11th International Conference on Image Analysis and Processing, 2001 , pp. 404-409.*

* cited by examiner

Primary Examiner — Wenpeng Chen
(74) Attorney, Agent, or Firm — Jianq Chyun IP Office

(57) ABSTRACT

A method for detecting a shadow of an object in an image is provided. A moving object in a plurality of continuous images is detected. A histogram of a color variation of the moving object in each of the images is calculated. The histograms of the color variation are accumulated to obtain a cumulative histogram. A distribution of the color variation in the cumulative histogram is estimated to obtain a shadow distribution function. Whether each pixel in a received image belongs to the shadow is determined by using the shadow distribution function.

17 Claims, 7 Drawing Sheets

METHOD FOR DETECTING SHADOW OF OBJECT

CROSS-REFERENCE TO RELATED APPLICATION

This application claims the priority benefit of Taiwan application serial no. 97142854, filed Nov. 6, 2008. The entirety of the above-mentioned patent application is hereby incorporated by reference herein and made a part of specification.

BACKGROUND OF THE INVENTION

1. Field of the Invention

The present invention generally relates to a digital image processing method, and more particularly, to a shadow detection method.

2. Description of Related Art

In recent years, many countries and governments have been alarmed by the insufficiency of national security information and started to devote themselves to the development of video security monitoring to enhance related security management measures. In addition, along with the increasing consciousness of our society to personal and community securities, the demand to video security monitoring products has been increasing quickly. Moving object detection plays a very important role in existing video monitoring systems. By correctly detecting the size and location of a moving object, the accuracy of subsequent operations (for example, abnormal event analysis and intrusion detection and analysis, etc) can be greatly increased.

In an existing video monitoring system, a moving object is usually captured through background subtraction or other similar digital image processing techniques. However, in the background subtraction technique, a shadow of an object is usually considered a foreground such that the size and location of the object cannot be determined accurately, and accordingly the subsequent analysis may be made difficult. Thus, a video monitoring system should be able to detect and eliminate the shadow of an object after the background of the object is removed.

FIG. 1 is a flowchart of a conventional shadow detection method. In step S110, the color characteristic of a background is subtracted from a foreground object to obtain the characteristic of the image. For example, statistical data of the background is compared with the foreground object to obtain a detection region of the shadow of the corresponding object.

In step S120, a color space transformation is performed to the image. For example, the color representation format in the detection region of the shadow of the object is transformed into corresponding intensity, saturation, and hue.

In step S130, a threshold is manually set according to the transformed image. For example, thresholds of intensity error, hue error, and saturation error are manually set.

In step S140, the shadow is detected in the image according to the threshold, so that the moving object and the shadow thereof can be differentiated. Compared to the background image, the shadow has similar hue but lower intensity. If the pixel value of a pixel in the transformed image satisfies the threshold which is set according to foregoing object characteristic, the pixel is determined to belong to the shadow; otherwise, the pixel is determined to belong to the object.

According to the conventional shadow detection method, specific parameters regarding specific scenes and light sources have to be manually set in order to correspond to the shadow characteristics of different images. All existing shadow eliminating methods focus on the transformation of color space and the selection of characteristics. However, a good threshold has to be manually set to achieve a good shadow segmentation in the transformed color space or characteristic space. This is mainly because of the variation between images, and the variation of light and shadow is difficult to control even in the same image. However, different ambient lights (for example, scattered light or direct light) produces shadows of very different characteristics in an image, even the intensity of a light may affect the characteristic of its shadow. Accordingly, shadow detection is made very difficult. Conventionally, different parameters are manually set regarding different scenes and different ambient lights so as to satisfy the characteristics of different shadows. However, the conventional technique is very difficult and inconvenient to be actually applied.

SUMMARY OF THE INVENTION

Accordingly, the present invention relates to a method for detecting a shadow of an object in an image, wherein the shadow can be detected through self learning so that it is not needed to manually set any parameter.

An embodiment of the present invention provides a shadow detection method including following steps. A moving object in a plurality of continuous images is detected. A histogram of a color variation of the moving object in each of the images is calculated. The histograms of the color variation in the images are accumulated to obtain a cumulative histogram. A distribution of the color variation in the cumulative histogram is estimated to obtain a shadow distribution function. Whether each pixel in a received image belongs to a shadow is determined by using the shadow distribution function.

According to an embodiment of the present invention, the step of detecting the moving object in the continuous images includes: capturing a background image; and subtracting the background image from each of the images to obtain an object image of the moving object in the image.

According to an embodiment of the present invention, the step of calculating the histogram of the color variation of the moving object in each of the images includes: subtracting images in the same regions of the background image from the object images to obtain the color variation of each pixel between the moving object and the background image; and calculating a distribution of the color variation of the pixels in the moving object to obtain the histogram of the color variation of the moving object.

According to an embodiment of the present invention, the step of accumulating the histograms of the color variation in the images to obtain the cumulative histogram includes: adding, multiplying, or averaging the corresponding color variation in the histograms of the color variation in the images to obtain the cumulative histogram.

According to an embodiment of the present invention, the step of estimating the distribution of the color variation in the cumulative histogram to obtain the shadow distribution function includes: estimating a Gaussian function curve approximate to a distribution curve of the color variation in a peak region of the cumulative histogram; and serving a function of the Gaussian function curve as the shadow distribution function, wherein the Gaussian function curve is estimated through a robust estimation.

According to an embodiment of the present invention, the step of determining whether each pixel in the received image belongs to the shadow by using the shadow distribution function includes: subtracting a background image from the received image to obtain an object image of the moving object; and determining whether a pixel value of each pixel in the object image falls within a pixel value range defined by the shadow distribution function, wherein it is determined that the pixel belongs to the shadow of the moving object if the pixel value falls within the pixel value range, and it is determined that the pixel belongs to the moving object if the pixel value does not fall within the pixel value range.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
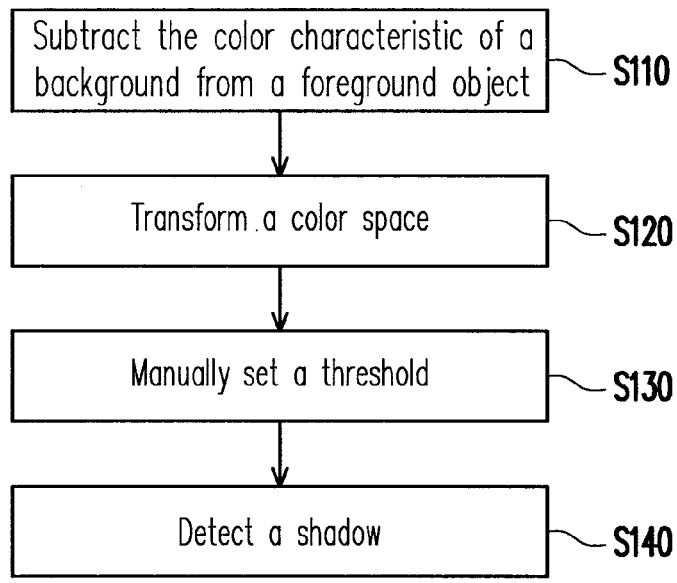
FIG. 1 is a flowchart of a conventional shadow detection method.

Reference will now be made in detail to the present preferred embodiments of the invention, examples of which are illustrated in the accompanying drawings. Wherever possible, the same reference numbers are used in the drawings and the description to refer to the same or like parts.

In the present invention, a color variation of a moving object is estimated and served as the characteristic of a shadow of the moving object, and a cumulative histogram is updated by accumulating many characteristic histograms. As a result, the region within which the shadow characteristic falls is enhanced and the other regions are weakened. Finally, a distribution function is estimated through robust estimation to parameterize the distribution of the shadow so that subsequently shadow detection can be carried out smoothly by using the distribution function. Embodiments of the present invention will be described below with reference to accompanying drawings.

Figure 2:
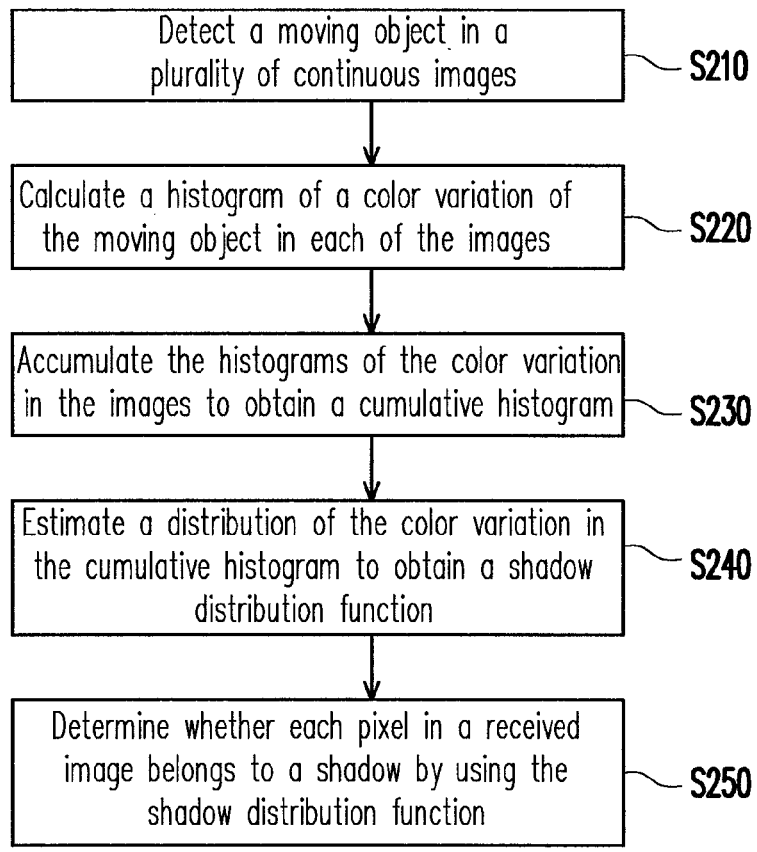
FIG. 2 is a flowchart of a shadow detection method according to an embodiment of the present invention.

FIG. 2 is a flowchart of a shadow detection method according to an embodiment of the present invention. Referring to FIG. 2, in the present embodiment, first, a moving object in a plurality of continuous images is detected (step S210). To detect the moving object, a background is first established and then subtracted from a current image to obtain a foreground. Each connected component (i.e., each entity) in the foreground is distinguished through connected component labeling method, and then the color characteristics of all the pixels in the connected component are obtained (referred to as observation) to be used for establishing a histogram subsequently.

Thereafter, a histogram of the moving object is calculated (step S220). Namely, a characteristic distribution of the moving object is calculated. Herein the value in the color space is not directly taken as the characteristic; instead, the color variation between the moving object and the background is used as the characteristic. This is because when the background is shielded by the shadow, the light intensities casted on the background are reduced to the same extent. Accordingly, the feature having similar response as the light source intensity has the characteristic that the characteristic value of the foreground and background fall within the same region. The shadow can be enhanced and the foreground can be weakened based on this characteristic so that the optimal shadow characteristic variation range can be calculated.

To be specific, in the present embodiment, images in the same regions of the background image are subtracted from the object image to obtain a color variation of each pixel between the moving object and the background image. Then, a distribution of the color variation of the pixels in the moving object is calculated to obtain a histogram of the color variation of the moving object. For example, a statistical distribution of pixel numbers of different pixel values in a gray scale image can be calculated to obtain the distribution of pixel numbers of pixel values 0-255.

Next, the histograms of the color variation in these images are accumulated to obtain a cumulative histogram (step S230). For example, the corresponding histograms produced by a plurality of continuous images are accumulated to update a cumulative histogram. By constantly updating the cumulative histogram by using many histograms, the region of the shadow in the cumulative histogram can be enhanced and the overall trend of the shadow in the image can be estimated.

Figure 3:
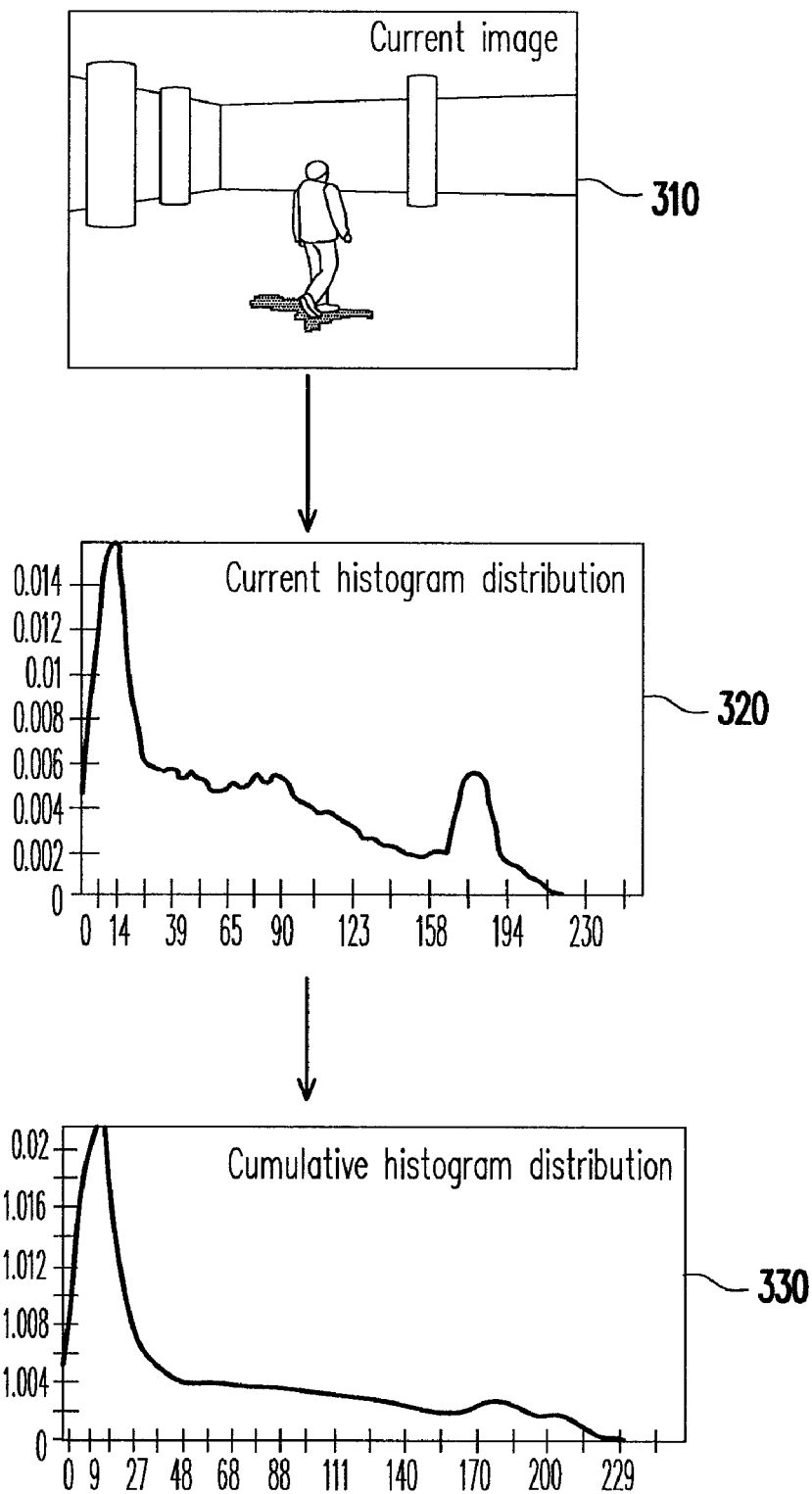
FIG. 3 illustrates a method for updating a cumulative histogram according to an embodiment of the present invention.

FIG. 3 illustrates a method for updating a cumulative histogram according to an embodiment of the present invention. Referring to FIG. 3, in the present embodiment, the numbers of pixels having different pixel values in a current image 310 are calculated and rendered as a histogram, so as to obtain a histogram 320 of the current image 310. Next, after obtaining the histograms of a plurality of current images through the same method, these histograms are accumulated and used for updating a cumulative histogram 330 through following expression:

$$\hat{\text{hist}}(i) = (\text{hist}(i))^{1-\alpha} \cdot (f(i))^{\alpha} \quad (1)$$

In foregoing expression, $\hat{\text{hist}}(i)$ and $\text{hist}(i)$ respectively represent the statistical value in the $i^{th}$ region (bin) of the cumulative histogram 330 before and after the cumulative histogram 330 is updated, $f(i)$ is the histogram 320 of the current image 310, and $\alpha$ is a learning rate which represents the influence of the current image 310 to the cumulative histogram 330. Herein $\alpha=0.1$; however, the present invention is not limited thereto. As shown in FIG. 3, after accumulating the histograms 320 of the current images 310, the disordered distribution in the histogram 320 of a single image 310 is eliminated, and the distribution region of the shadow is enhanced. Accordingly, the accuracy in subsequent shadow detection is improved.

After that, a distribution of the color variation in the cumulative histogram is estimated to obtain a shadow distribution function (step S240). To be specific, a Gaussian function curve approximate to the distribution curve of the color variation in the cumulative histogram and a matching function thereof are calculated to well describe the characteristic of the distribution curve. For example, a Gaussian function curve approximate to the distribution curve of the color variation within a peak region of the cumulative histogram is estimated and a function of the Gaussian function curve is served as the shadow distribution function.

Figure 4A:
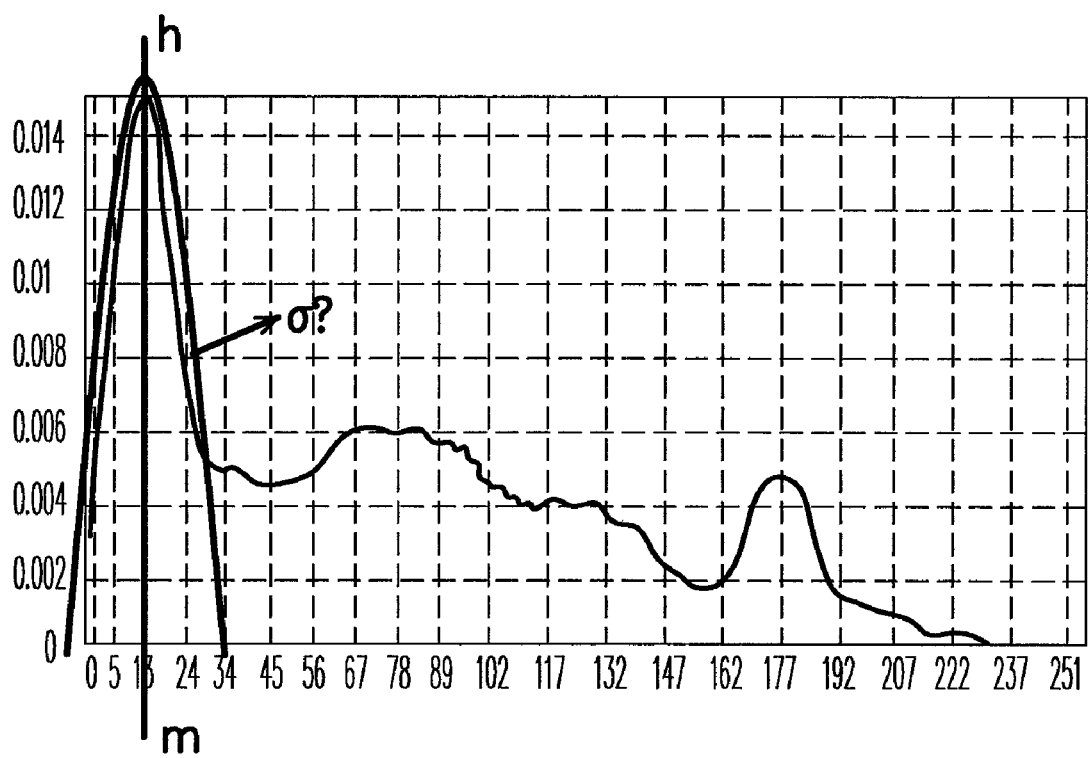
FIG. 4A illustrates a method for estimating a shadow distribution function according to an embodiment of the present invention.
Figure 4B:
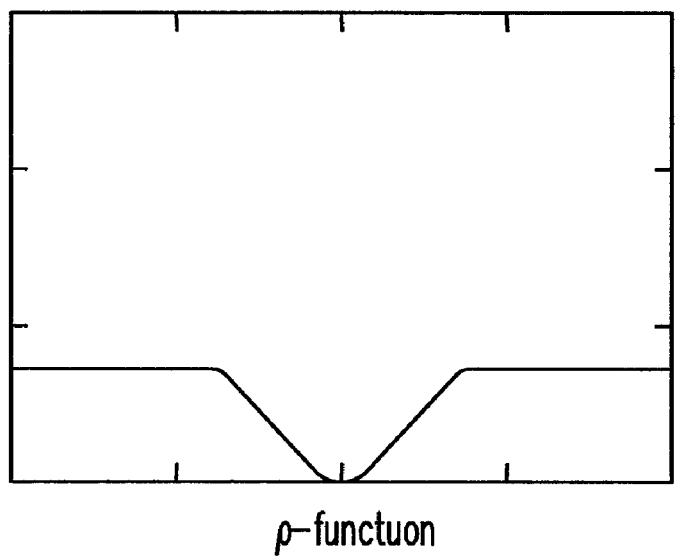
FIG. 4B illustrates an influence function ρ according to an embodiment of the present invention.

FIG. 4A illustrates a method for estimating a shadow distribution function according to an embodiment of the present invention, and FIG. 4B illustrates an influence function ρ according to an embodiment of the present invention. Referring to both FIG. 4A and FIG. 4B, in the present embodiment, the Gaussian function curve is estimated through a robust estimation so as to describe the distribution of the shadow. Assuming that a mean value m of the Gaussian function curve falls at the maximum peak of the cumulative histogram, and height h is a statistical value of a region m on the Gaussian function curve, the Gaussian function curve can be expressed as:

$$g(i, m, h, \sigma) = h \cdot \exp\left(-\frac{i-m}{2\sigma^2}\right) \quad (2)$$

Accordingly, the matching function can be obtained by estimating σ, namely, $$\hat{\sigma} = \operatorname*{argmin}_{\sigma} \sum_{i} (g(i, m, h, \sigma) - hist(i)) \quad (3)$$

However, this function is easily affected by outlier. Herein the outlier refers to the distribution of pixels which do not belong to the shadow in the histogram. Thus, the most suitable $\hat{\sigma}$ is obtained through M-estimation. In this method, different weights are assigned to (g(i,m,h,σ)−hist(i)) through the influence function ρ to reduce the influence of the outlier. Thus, foregoing expression (3) can be converted into:

$$\hat{\sigma} = \operatorname*{argmin}_{\sigma} \sum_{i} \rho(g(i, \sigma) - hist(i)) \quad (4)$$

In the present embodiment, a Tukey's biweight function is served as the influence function ρ, as expressed below:

$$\rho(x) = \begin{cases} \frac{c^2}{6}\left(1 - [1 - ((x/c)^2)]^3\right) & \text{if } |x| \leq c \\ \frac{c^2}{6} & \text{if } |x| > c \end{cases} \quad (5)$$

Shadow detection can be carried out by using the estimated Gaussian function curve. According to the definition of statistics, a pixel is determined to belong to the shadow when the characteristic value of the pixel falls within multiples of the standard deviation (σ) of the Gaussian function curve. Herein 2.5 times of the standard deviation is taken; however, the present invention is not limited thereto.

It should be noted that the shadow detection method in the present invention can be divided into a training stage and an application stage, wherein the training stage is to establish a good shadow distribution function, and the application stage is to detect the shadow by using the shadow distribution function. The steps described above belong to the training stage.

Figure 5:
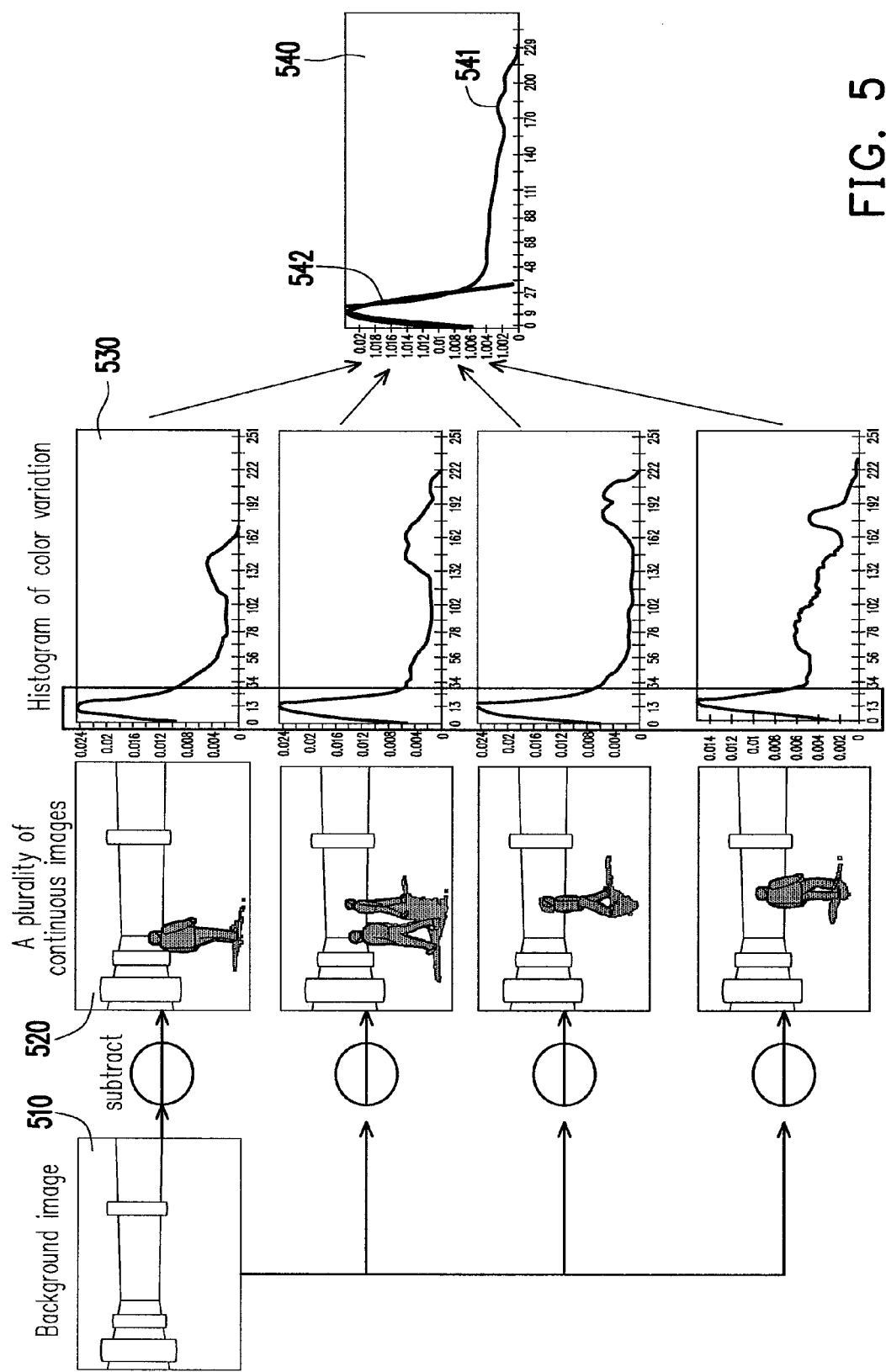
FIG. 5 is a diagram of a training stage in a shadow detection method according to an embodiment of the present invention.

FIG. 5 is a diagram of a training stage in a shadow detection method according to an embodiment of the present invention. Referring to both FIG. 2 and FIG. 5, in the present embodiment, a background image 510 is respectively subtracted from a plurality of continuous images 520 to detect a moving object in each of the images 520. Once the moving object is detected, a histogram 530 of the color variation of the moving object can be calculated.

For example, if the color variation of the pixels is distributed between 0 and 255, the color variation of each pixel in the object image of the moving object can be calculated, and the histogram 530 of the color variation can be rendered according to the distribution of the color variation by taking the color variation (i.e., 0~255) as the abscissa and the number of pixels as the ordinate.

Thereafter, the histograms of the color variation in the object images of the moving object are accumulated to obtain a cumulative histogram 540. The cumulative histogram 540 is used for estimating the entire trend of the shadow in the image, and a shadow distribution function 542 can be obtained by calculating a Gaussian function curve approximate to a distribution curve 541 of the color variation in the cumulative histogram 540.

As described above, the training stage keeps updating the cumulative histogram, meanwhile the application stage is entered once the shadow distribution function becomes stable. During the application stage, whether each pixel in a received image belongs to the shadow is determined by using the shadow distribution function obtained during the training stage (step S250). To be specific, if the pixel value of a pixel in the received image satisfies the shadow distribution function, the pixel is determined to belong to the shadow; otherwise, if the pixel value of the pixel does not satisfy the shadow distribution function, the pixel is determined to belong to the object.

Through foregoing estimation and detection operations in the training stage and the application stage, an ideal shadow distribution function can be estimated regarding different scene and different ambient light and accordingly can detect the shadow correctly. It should be noted that the color image portion is not taken into consideration in the embodiment described above. The shadow detection method provided by the present invention can be applied to a color image by simply adopting a color space transformation step, which will be described in detail below with reference to another embodiment of the present invention.

Figure 6:
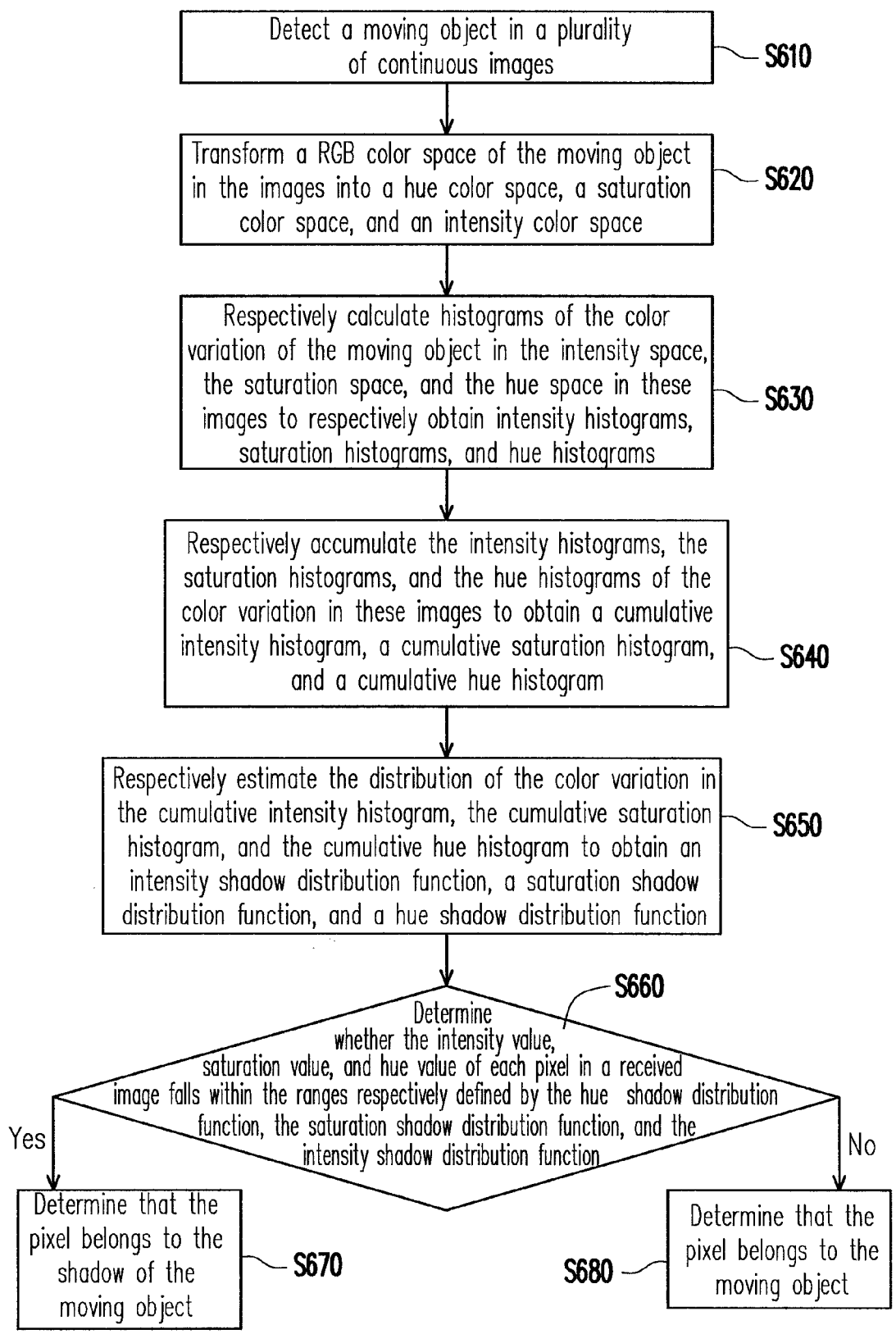
FIG. 6 is a flowchart of a shadow detection method according to an embodiment of the present invention.

FIG. 6 is a flowchart of a shadow detection method according to an embodiment of the present invention. Referring to FIG. 6, in the present embodiment, first, a moving object in a plurality of continuous images is detected (step S610). To be specific, the intensity of each pixel in a background image is subtracted from the intensity of each pixel in the images to obtain the moving object in these images.

Next, a color space transformation is performed to the moving object in the images (step S620). Unlike the embodiment described above, the color space transformation is further performed in the present embodiment. Generally, the color space of an image includes black/white, gray scale, and RGB color space, YCrCb color space, and hue/saturation/intensity (HSI) color space, etc. In the present embodiment, the detailed process of the shadow detection method in the present invention will be described by taking the HSI color space as an example; however, those skilled in the art should be able to apply the present invention to other color spaces according to the actual requirement.

As described above, in step S620, the moving object in the images is transformed from a RGB color space to a HSI color space. This is because the characteristic of the shadow can be better described in the HSI color space. Generally speaking, when a background image is shielded by a shadow, the hue and saturation thereof do not change much, but the intensity thereof will be attenuated differently depending on whether the shadow is a penumbra or an umbra. The color space transformation between the RGB color space and the HSI color space is expressed as:

$$\max = \text{MAX}(R, G, B), \quad (6)$$
$$\min = \text{MIN}(R, G, B),$$

$$A = \begin{cases} 0, & \text{if } \max = \min \\ \left(60° \times \frac{G-B}{\max - \min} + 0°\right) \bmod 360°, & \text{if } \max = R \\ 60° \times \frac{B-R}{\max - \min} + 120°, & \text{if } \max = G \\ 60° \times \frac{R-G}{\max - \min} + 240°, & \text{if } \max = B \end{cases}$$

$$S = \begin{cases} 0, & \text{if } \max = 0 \\ \frac{\max - \min}{\max} = 1 - \frac{\min}{\max}, & \text{otherwise} \end{cases}$$

$$I = \max$$

In foregoing expressions, the hue variation is linearly converted from 0°~360° to 0~255, the saturation variation is linearly converted from −1~1 to 0~255, and the negative value of the intensity variation is ignored (because the intensity of the shadow should not be stronger than the original intensity of the background) and it falls within 0~255 in the histogram.

After the color space transformation is performed, histograms of the color variation of the moving object in the intensity space, the saturation space, and the hue space in these images are respectively calculated to respectively obtain the intensity histograms, saturation histograms, and hue histograms (step S630).

After that, the intensity histograms, the saturation histograms, and the hue histograms of the color variation in these images are respectively accumulated to obtain a cumulative intensity histogram, a cumulative saturation histogram, and a cumulative hue histogram (step S640).

Finally, the distribution of the color variation in the cumulative intensity histogram, the cumulative saturation histogram, and the cumulative hue histogram is respectively estimated to obtain an intensity shadow distribution function, a saturation shadow distribution function, and a hue shadow distribution function (step S650).

Figure 7:
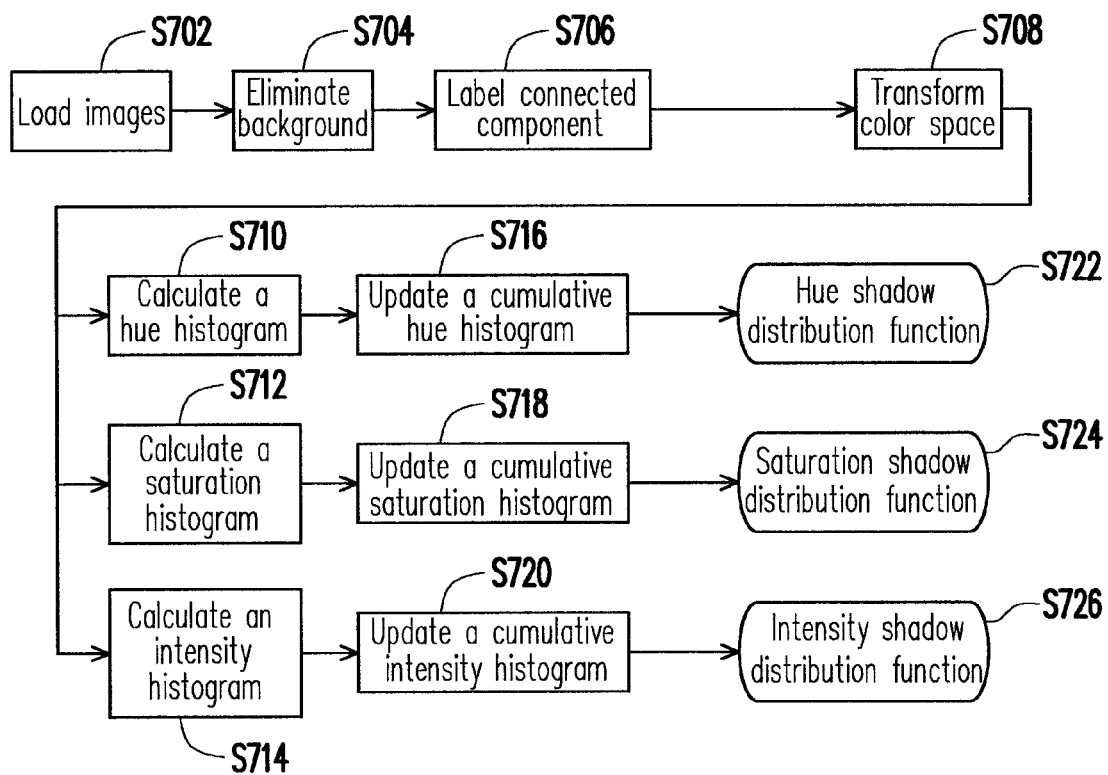
FIG. 7 is a diagram of a training stage in a shadow detection method according to an embodiment of the present invention.

FIG. 7 is a diagram of a training stage in a shadow detection method according to an embodiment of the present invention. Referring to FIG. 6 and FIG. 7, first, a plurality of training images which are continuous in the time domain is loaded from a video monitoring system (step S702). Then, the intensity of each pixel in a background image is subtracted from the intensity of each pixel in these images to obtain an object image of a moving object in these images (step S704).

However, edges of the object images may be broken up due to the affection of noises. Thus, the edges of the object images are smoothed through a connected component labeling method (step S706). To be specific, an edge is converted into a binary image, and the number of components in the binary image is calculated through the connected component labeling method. Then, the found components are represented with a minimum rectangular frame, and if the distance between two adjacent components within the minimum rectangular frame is not greater than a specific minimum value, the corresponding edge portion is considered connected. Accordingly the edges of the object images are fixed.

Thereafter, a color space transformation is performed (step S708). In the present embodiment, the color space of the moving object in the images is transformed into a hue (H) space, a saturation (S) space, and an intensity (I) space, and histograms of the color variation of the moving object in the images are calculated respectively in the intensity space, the saturation space and the hue space, so as to obtain the intensity histograms, the saturation histograms, and the hue histograms (steps S710-714).

The intensity histograms, saturation histograms, and hue histograms of the moving object are respectively accumulated to obtain a cumulative intensity histogram, a cumulative saturation histogram, and a cumulative hue histogram (steps S716-720). These cumulative histograms are then used for estimating the entire trend of the shadow in the images. A hue shadow distribution function, a saturation shadow distribution function, and an intensity shadow distribution function are obtained by estimating the distribution of the color variation in the cumulative intensity histogram, the cumulative saturation histogram, and the cumulative hue histogram (steps S722-726).

Finally, whether each pixel in a received image belongs to the shadow is determined by using foregoing hue shadow distribution function, saturation shadow distribution function, and intensity shadow distribution function (step S660 in FIG. 6). To be specific, a pixel is determined to belong to the shadow when the hue, saturation, and intensity of the moving object in the image respectively fall within the ranges defined by the hue shadow distribution function, the saturation shadow distribution function, and the intensity shadow distribution function. To be specific, first, whether the intensity value of each pixel in the object image falls within an intensity value range defined by the intensity shadow distribution function is determined. If the intensity value of the pixel falls within the intensity value range, whether the saturation value of the pixel falls within a saturation value range defined by the saturation shadow distribution function is determined. If the saturation value of the pixel falls within the saturation value range, whether the hue value of the pixel falls within a hue value range defined by the hue shadow distribution function is determined. Finally, if the hue value of the pixel falls within the hue value range, the pixel is determined to belong to the shadow of the moving object (step S670). Otherwise, if the intensity value of the pixel does not fall within the intensity value range, the saturation value of the pixel does not fall within the saturation value range, or the hue value of the pixel does not fall within the hue value range, the pixel is determined to belong to the moving object (step S680).

Figure 8:
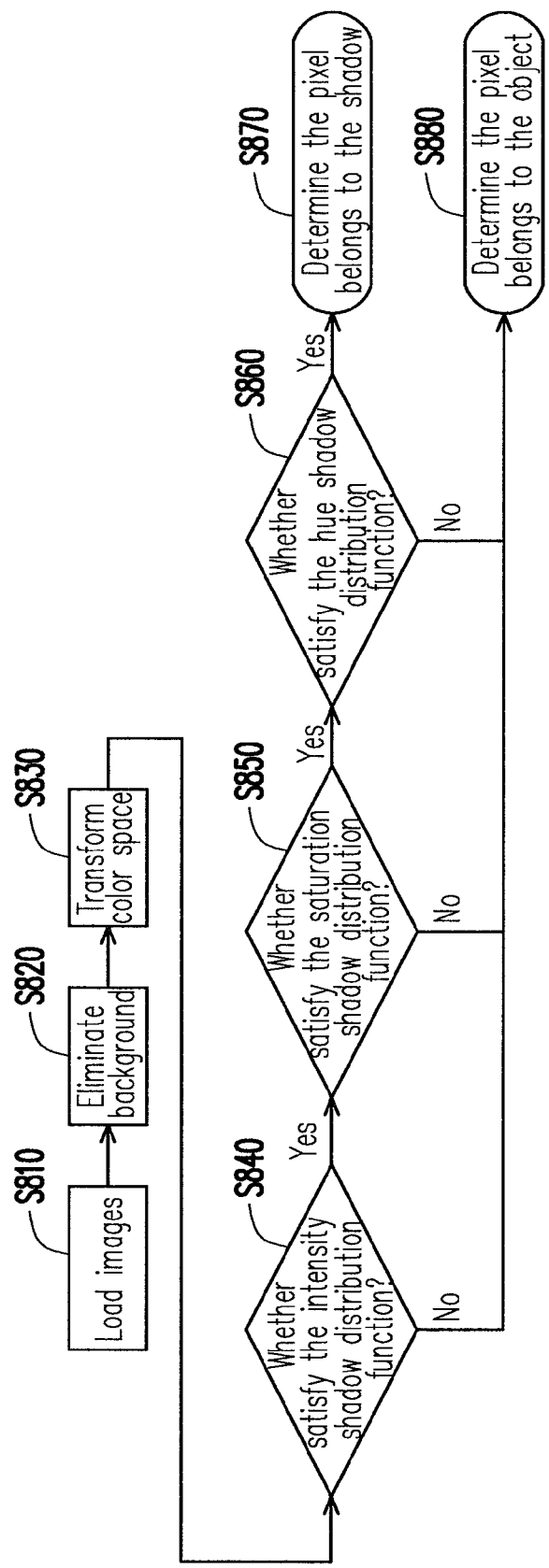
FIG. 8 is a diagram of an application stage in a shadow detection method according to an embodiment of the present invention.

FIG. 8 is a diagram of an application stage in a shadow detection method according to an embodiment of the present invention. Referring to both FIG. 6 and FIG. 8, first, an original application image is loaded (step S810), wherein this image may be an image in the RGB color space captured by a community monitoring system. Then, a background image is subtracted from the image to obtain an object image of a moving object (step S820). Next, the color space of the object image is transformed into an intensity space, a saturation space, and a hue space, and an intensity value, a saturation value, and a hue value of each pixel in the object image are obtained (step S830).

Thereafter, whether the intensity value of each pixel in the object image falls within an intensity value range defined by the intensity shadow distribution function is determined (step S840). If the intensity value of the pixel falls within the intensity value range (the intensity of the object image satisfies the intensity shadow distribution function), whether the saturation value of the pixel falls within a saturation value range defined by the saturation shadow distribution function is further determined (step S850). If the saturation value of the pixel falls within the saturation value range (the saturation of the object image satisfies the saturation shadow distribution function), whether the hue value of the pixel falls within a hue value range defined by the hue shadow distribution function (step S860). Finally, if the hue value of the pixel falls within the hue value range (the hue of the object image satisfies the hue shadow distribution function), the pixel is determined to belong to the shadow of the moving object (step S870).

However, if one of the hue, the saturation, and the intensity of the object image does not satisfy the corresponding shadow distribution function, namely, if the intensity value of the pixel does not fall within the intensity value range, the saturation value of the pixel does not fall within the saturation value range, or the hue value of the pixel does not fall within the hue value range, the pixel is determined to belong to the moving object (step S880).

As described above, in the shadow detection method provided by the present invention, a shadow function is automatically estimated through self learning by calculating and observing the distribution of a color variation in a plurality of sample images, so as to find out the location and range of the color space within which the shadow falls. Thus, the shadow of a foreground moving object can be correctly detected without manually setting any parameter. As a result, the purpose of automatic shadow detection is accomplished.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A shadow detection method, comprising:
   detecting a moving object in a plurality of continuous images;
   calculating a histogram of a color variation of the moving object in each of the images;
   accumulating the histograms of the color variation in the images to obtain a cumulative histogram;
   estimating a distribution of the color variation in the cumulative histogram to obtain a shadow distribution function; and
   determining whether each pixel in a received image belongs to a shadow by using the shadow distribution function.

2. The shadow detection method according to claim 1, wherein the step of detecting the moving object in the continuous images comprises:
   capturing a background image; and
   subtracting the background image from each of the images to obtain an object image of the moving object in the image.

3. The shadow detection method according to claim 2, wherein the step of subtracting the background image from each of the images to obtain the object image of the moving object in the image further comprises:
   labeling a plurality of connected components in the images after the background image is subtracted from the images.

4. The shadow detection method according to claim 2, wherein the step of calculating the histogram of the color variation of the moving object in each of the images comprises:
   subtracting images in same regions of the background image from each of the object images to obtain the color variation of each pixel between the moving object and the background image; and
   calculating a distribution of the color variation of the pixels in the moving object to obtain the histogram of the color variation of the moving object.

5. The shadow detection method according to claim 4, wherein the step of accumulating the histograms of the color variation in the images to obtain the cumulative histogram comprises adding, multiplying, or averaging the corresponding color variation in the histograms of the color variation in the images to obtain the cumulative histogram.

6. The shadow detection method according to claim 1, wherein the step of estimating the distribution of the color variation in the cumulative histogram to obtain the shadow distribution function comprises:
   estimating a Gaussian function curve approximate to a distribution curve of the color variation in a peak region of the cumulative histogram, and serving a function of the Gaussian function curve as the shadow distribution function.

7. The shadow detection method according to claim 6, wherein the step of estimating the similar Gaussian function curve comprises estimating the similar Gaussian function curve through a robust estimation.

8. The shadow detection method according to claim 1, wherein the step of determining whether each pixel in the received image belongs to the shadow by using the shadow distribution function comprises:
   subtracting a background image from the received image to obtain an object image of the moving object;
   determining whether a pixel value of each pixel in the object image falls within a pixel value range defined by the shadow distribution function;
   determining that the pixel belongs to the shadow of the moving object if the pixel value of the pixel falls within the pixel value range; and
   determining that the pixel belongs to the moving object if the pixel value of the pixel does not fall within the pixel value range.

9. The shadow detection method according to claim 8, wherein the pixel value range is contained by a pixel value range from a pixel value corresponding to a peak of the shadow distribution function minus a multiple of a standard deviation of the shadow distribution function to the pixel value corresponding to the peak of the shadow distribution function plus the multiple of the standard deviation of the shadow distribution function.

10. The shadow detection method according to claim 1, wherein after the step of detecting the moving object in the continuous images, the shadow detection method further comprises:
    transforming a color space of the moving object in the images.

11. The shadow detection method according to claim 10, wherein the step of transforming the color space of the moving object in the images comprises:
    transforming the color space of the moving object in the images into an intensity (I) space, a saturation (S) space, and a hue (H) space.

12. The shadow detection method according to claim 11, wherein the step of calculating the histogram of the color variation of the moving object in each of the images comprises:

respectively calculating the histogram of the color variation of the moving object in each of the images regarding the intensity space, the saturation space, and the hue space to obtain an intensity histogram, a saturation histogram, and a hue histogram.

13. The shadow detection method according to claim 12, wherein the step of accumulating the histograms of the color variation in the images to obtain the cumulative histogram comprises:

respectively accumulating the intensity histograms, the saturation histograms, and the hue histograms of the color variation in the images to obtain a cumulative intensity histogram, a cumulative saturation histogram, and a cumulative hue histogram.

14. The shadow detection method according to claim 13, wherein the step of estimating the distribution of the color variation in the cumulative histogram to obtain the shadow distribution function comprises:

respectively estimating the distribution of the color variation in the cumulative intensity histogram, the cumulative saturation histogram, and the cumulative hue histogram to obtain an intensity shadow distribution function, a saturation shadow distribution function, and a hue shadow distribution function.

15. The shadow detection method according to claim 14, wherein the step of determining whether each pixel in the received image belongs to the shadow by using the shadow distribution function comprises:

subtracting a background image from the received image to obtain an object image of the moving object;

transforming a color space of the object image into the intensity space, the saturation space, and the hue space to obtain an intensity value, a saturation value, and a hue value of each pixel in the object image;

determining whether the intensity value of each pixel in the object image falls within an intensity value range defined by the intensity shadow distribution function;

determining whether the saturation value of the pixel falls within a saturation value range defined by the saturation shadow distribution function if the intensity value of the pixel falls within the intensity value range;

determining whether the hue value of the pixel falls within a hue value range defined by the hue shadow distribution function if the saturation value of the pixel falls within the saturation value range; and determining that the pixel belongs to the shadow of the moving object if the hue value of the pixel falls within the hue value range.

16. The shadow detection method according to claim 15, wherein the step of determining whether each pixel in the received image belongs to the shadow by using the shadow distribution function further comprises:

determining that the pixel belongs to the moving object if the intensity value of the pixel does not fall within the intensity value range, the saturation value of the pixel does not fall within the saturation value range, or the hue value of the pixel does not fall within the hue value range.

17. The shadow detection method according to claim 10, wherein the step of transforming the color space of the moving object in the images comprises:

transforming the color space of the moving object in the images into an intensity (Y) space, a blue (Cb) space, and a red (Cr) space.

* * * * *